United States Patent [19]

Melchior

[11] 3,798,363

[45] Mar. 19, 1974

[54] COLOR SELECTION CIRCUIT FOR VISUAL DISPLAY UNIT

[75] Inventor: Gérard Melchior, Paris, France

[73] Assignee: Compagnie Industrielle des Telecommunications Cit-Alcatel, Paris, France

[22] Filed: June 8, 1972

[21] Appl. No.: 261,109

[30] Foreign Application Priority Data

June 8, 1971 France ............................ 71.20689

[52] U.S. Cl. .................................................... 178/6
[51] Int. Cl. ............................................ H04m 7/18
[58] Field of Search............. 178/5.4 PE, 5.4 TE, 6; 235/198; 340/324 A

[56] References Cited

UNITED STATES PATENTS

| | | | |
|---|---|---|---|
| 3,651,508 | 3/1972 | Scarborough, Jr. et al. | 340/324 A |
| 3,659,281 | 4/1972 | Mori | 340/324 A |
| 3,551,896 | 12/1970 | Baskin et al. | 340/324 A |

*Primary Examiner*—Robert L. Griffin
*Assistant Examiner*—Joseph A. Orsino, Jr.
*Attorney, Agent, or Firm*—Craig and Antonelli

[57] ABSTRACT

In a visual display unit including a color cathode ray tube, a vector generator for controlling the tracing of vectors on the cathode ray tube, a color control unit for changing the color of the trace by varying the voltage applied to the tube and a light pen to be placed in proximity to the screen of the tube for detecting the vectors traced on the tube, a color selection circuit is provided including a switching arrangement for actuating the light pen only in connection with control by said color control unit to produce a trace of a selected color.

8 Claims, 2 Drawing Figures

COLOR SELECTION CIRCUIT FOR VISUAL DISPLAY UNIT

The present invention relates to a visual color display unit. The unit may be used for the observation of the motion of different movable objects or the traces of various mathematical curves on a screen.

A visual color display unit has been proposed which includes a color cathode ray tube, and a vector generator controlling the trace on the screen of the tube. The vectors may, for example, represent the motion of movable objects in a certain given region of space. In order that the paths of the different objects may be better distinguished, each trace may be represented in a different color. The color visual display unit then includes a color changing unit which is controlled by the vector generator and which allows the high voltage applied to the color tube to be modified so as to cause a change in color of the trace. Such a unit is generally provided with a photosensitive detector device or light pen. This light pen can be displaced in front of the screen of the tube and is formed by a photosensitive cell detecting the luminous flux produced by a luminous color spot appearing on the screen. If the luminous spot sweeps the screen, a succession of pulses appear at the output of the light pen, the characteristics of which depend on the intensity and the speed of the spot.

The different traces on the screen are then formed by vectors from which the generator controls the trace. This generator itself is controlled by a computer. The light pen directed towards a particular point of a graph allows the computer to be interrogated about this particular point owing to the signals produced. If, for example, the graph represents the speed of a movable object, the pointing of the light pen towards this particular spot allows the computer to read out with precision the speed of the movable object at this point. Generally, the light pen is provided with a control switch for turning it on and off. This switch is placed between the photosensitive cell and the computer. With three or four colors, for example, the path of each movable object is represented in a particular color and it can happen that several paths intersect at any given point resulting in ambiguity in the information relating to a particular path at that point.

According to the present invention, there is provided a visual display unit comprising a color cathode ray tube, a vector generator for controlling the tracing of vectors on the tube, a color control unit for changing the color of the trace by varying a voltage applied to the tube, a light pen for detecting the vectors traced on the tube, a first switch for connecting the light pen to computer circuitry, and a control circuit sensitive to a trace color signal and for arranging that the switch is only closed when a trace of a selected color appears on the screen.

Preferably the color control unit has *n* outputs corresponding to each color trace, each of the outputs being connected to the control circuit and a color selection switch is provided for selecting which color of trace causes the main switch to close. Separate terminals of the selection switch may be connected to respective outputs of the color control unit and a common terminal connected to the control circuit. Alternatively, the color selection switch may have terminals connected to first inputs of AND-gates whose second inputs are connected to respective outputs of the control circuit.

The main switch for connecting the light pen to the computer circuitry is preferably an AND-gate and the circuitry may be a computer for producing information from traces detected by the light pen.

The present invention will now be described in more detail, by way of example only, with reference to the accompanying diagrammatic drawings, in which.

In the respective drawings like reference numerals correspond to corresponding components.

Figure 1:
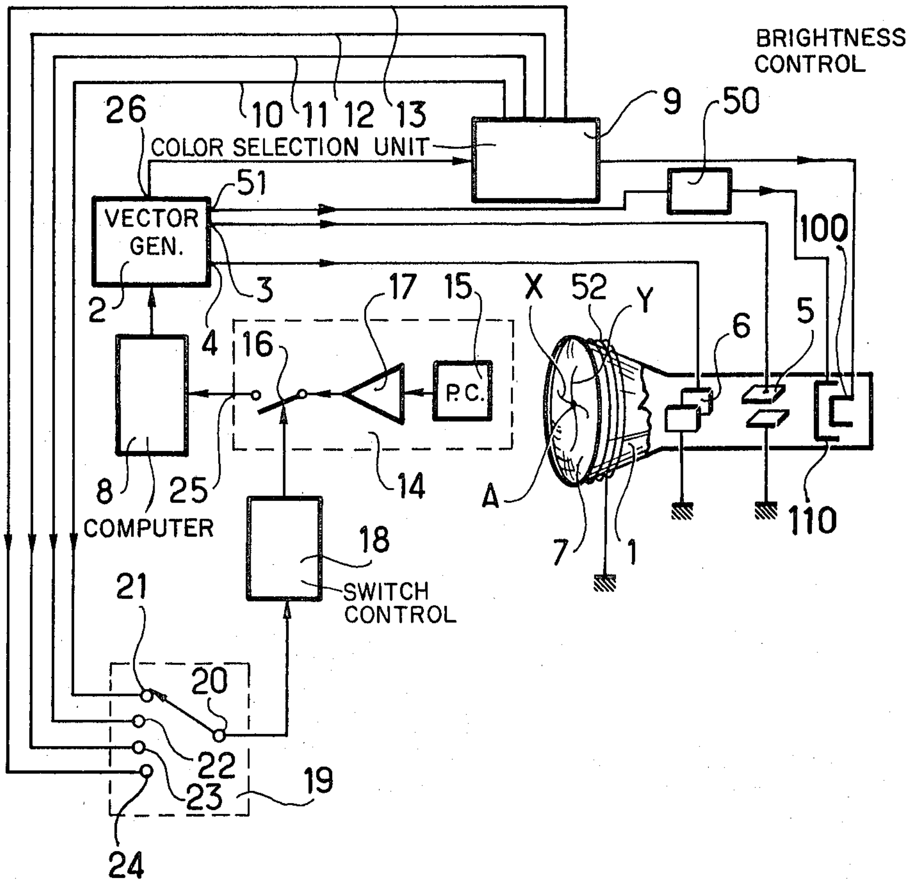
FIG. 1 is a schematic block diagram of a visual display unit.

The visual display unit in FIG. 1 comprises a color cathode ray tube 1, for example a dichromesynthesis tube, for producing four different colored traces. A vector generator 2 controls a vertical deflection plate 5 and a horizontal deflection plate 6 of the tube 1 through its respective outputs 3 and 4 so that a vector may be traced on a screen 7 of the tube 1. The plates facing the respective plates 5 and 6 are presumed to be held at a fixed reference potential.

The vector generator 2 is controlled by a computer 8 and it is also capable of changing the color of the trace through a color change unit 9 for altering the high voltage applied to a cathode 100 of the tube 1. The Whenelt electrode 110 of the tube is presumed to be held at a negative potential, which may be varied so as to alter the brightness of the trace. The negative potential of the Whenelt electrode is varied through a device 50, which is a conventional device provided to control brightness, connected to an output 51 of the vector generator 2. The device 50 modulates the intensity of the electron beam to modify the brightness of the trace on the screen. Such devices are commonly associated with color cathode ray tubes since the brightness of the trace varies for the different colors. An anode 52 of the tube 1 is presumed to be held at a fixed reference potential and so this system allows the color of the trace to be varied by varying the voltage applied to the tube.

The coloring system includes n output color channels 10, 11, 12 and 13 for respective colors. As in the present case where four colors are employed, four color channels are provided. Each color output channel corresponds to a predetermined color and whenever a trace is being formed with that color, it delivers a trace signal on the corresponding output.

A photosensitive detector 14 is provided as a light pen which may be moved in front of the screen 7. The light pen includes a photosensitive cell 15 detecting luminous flux produced by a colored light point appearing on the screen 7. A switch 16 is able to connect an amplifier 17 fed by the cell 15, to the computer 8. The amplifier 17 amplifies signals coming from the output of the cell 15. The switch 16 is provided with a control unit 18 for operating it at a predetermined instant of time.

A color selection switch 19 has an output 20 connected to an input of the control unit 18 controlling the switch 16. The four inputs 21, 22, 23 and 24 of the switch 19 are connected to the four channels of the color output of a color changing unit 9. The operation of the device will now be described.

In the following explanation it will be assumed that two lines X and Y are traced on the screen in different colors, for example red and green, and that the two lines represent, for example, the motion of two mobile objects as a function of time. The two graphs intersect at a point *a*. The displacement of the light pen along the graph X, for example, allows the computer 8 to calculate the speed of the mobile object at any instant of time. At the point of intersection *a*, the computer receives an ambiguous signal. The light pen is sensitized by the red trace X and the green trace Y and the computer therefore gives results which are ambiguous. It is therefore necessary, in order to study the graph X, for example, that the light pen should be color selective.

The different color vectors are traced successively and the color change unit 9 delivers a different signal at each instant of time, for example a binary signal, characterizing each color of the trace. If, for example, the channel 10 controlling the red color delivers such a signal, the switch 19 may be placed in the position 20, 21 and the unit 18 controlling the switch 16 operates to arrange the closure of the switch only at the instant of time when the red signal is being traced on the screen 7. In these conditions, the light pen 14 only produces those signals at its output which relate to the red color trace.

If the channels 11, 12 and 13 deliver signals corresponding, for example to orange, yellow and green, at any instant of time when a trace of the corresponding color is being formed, the switch 19 may be placed in the position 20, 22 in order to make the light pen selective to the color orange. In a similar manner the positions 20, 23 and, 20, 24 make the light pen selective to the respective colors yellow and green. The ambiguity which was produced at the point of intersection *a* of the graphs X and Y is therefore removed.

Figure 2:
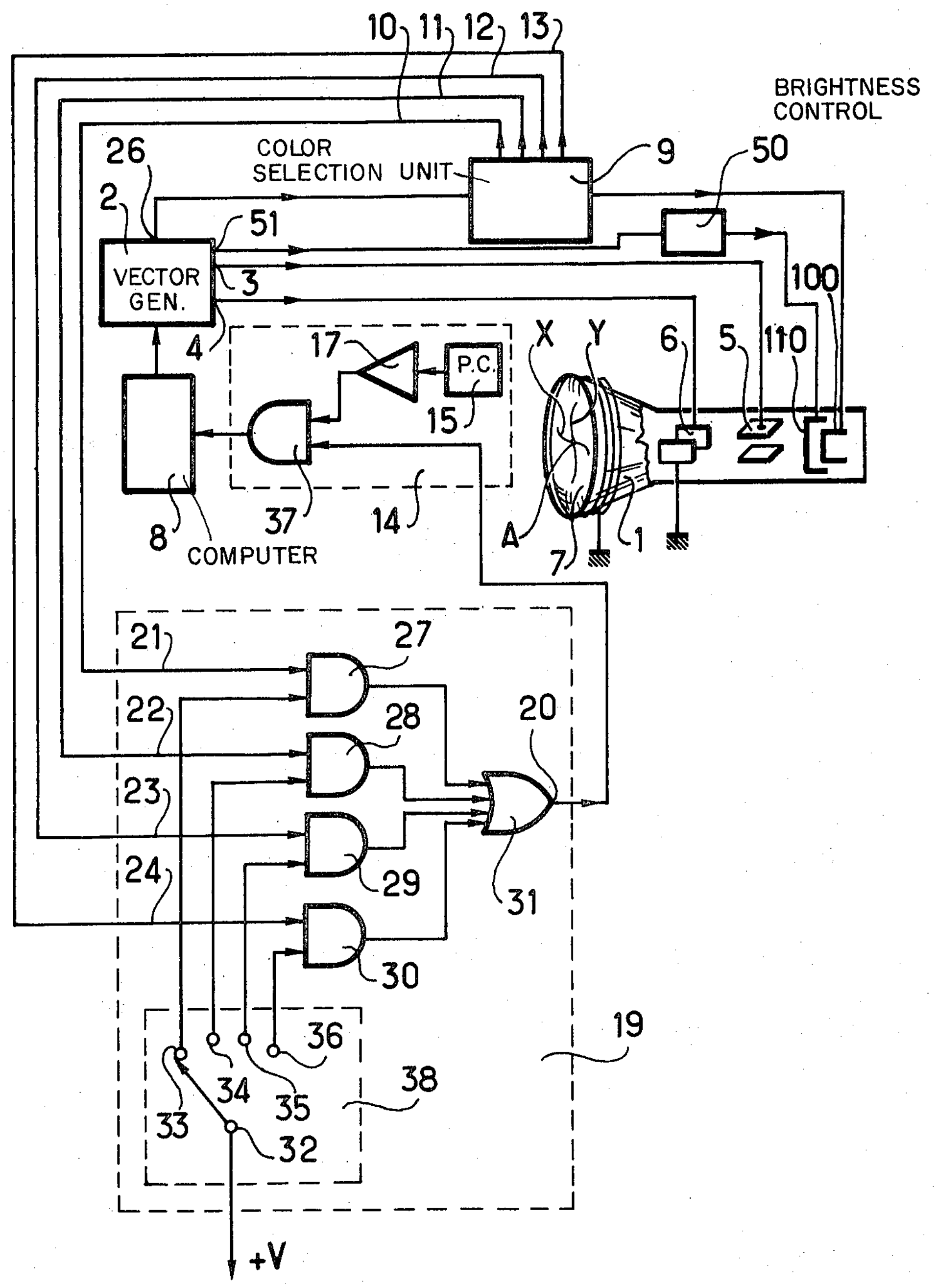
FIG. 2 is a more detailed block diagram of the visual display unit.

The visual display unit in FIG. 2 shows the circuit arrangement in more detail. The switch 16 and its control unit 18 are provided by a logic AND-gate 37.

The output and the inputs 20, 21, 22, 23 and 24 of the color section switch are as shown in FIG. 1. If as in the previous example, the channel 10 of the color change unit produces a binary signal at any moment of time when a red trace is being formed, this signal is transmitted to the input 21 of the selection switch 19. The selection switch 19 includes four logic AND-gates 27, 28, 29 and 30 having outputs connected to the inputs of an OR-gate 31. Each AND-gate has one input connected to each terminal of a color detection control unit 38, here shown as terminals 33, 34, 35 and 36 of an end position control switch and of which one output terminal 32 is common. The end position control switch has in this case four positions corresponding to the four colors. The terminal 32 is held at a potential corresponding to the logic opening level of each gate. If it is desired to detect the red color by the light pen, the switch 38 is placed in position 32, and 33 so that the AND-gate 27 is open and produces a signal at the output at each instant of time where a signal from the red trace appears on the corresponding channel 10. The OR-gate 31 transmits a signal to the AND-gate 37 through its output 20. If the photosensitive cell is facing the red trace, the gate 37 is open and an interrogation signal concerning the red trace arrives at the computer 8 at each moment of time when a signal of the red trace appears on the channel 10. The switch 38 could also be placed in the positions 32, 34 to detect the orange trace and in the position 32 and 35 to detect the yellow trace. Similarly, the positions 32, 36 enable the green trace to be detected.

It is clear that the control switch 38 would allow the color to be detected to be selected if a different kind of switch could be employed. The described device has the advantage that the computer may be questioned in a selective manner without amgibuity at a point of intersection of several color traces.

What is claimed is:

1. In a visual display unit including a color cathode ray tube, computing means including a vector generator for controlling the tracing of vectors on the tube, a color control unit for changing the color of the trace by varying a voltage applied to the tube and a light pen for detecting the vectors traced on the tube, the improvement comprising a first switch for connecting the light pen to said computing means, and control circuit means responsive to said color control unit for closing said switch only when a trace of a selected color appears on the screen, wherein said color control unit has n outputs each providing a signal corresponding to a different color trace, each of the outputs being connected to said control circuit means.

2. A visual display unit as claimed in claim 1 wherein said computing means connected to said first switch is a computer for producing information from the traces on the cathode ray tube.

3. A display unit as claimed in claim 1 further including a color selection switch for selecting which color of trace causes said first switch to close, separate terminals of the selection switch being connected to respective *n* outputs of the color control unit and a common terminal being connected to said control circuit means.

4. A display unit as claimed in claim 1 further including a color selection switch for selecting which color of trace causes said first switch to close, *n* AND-gates having respective first inputs connected to the *n* outputs of said color control unit and respective second inputs connected to separate terminals of the color selection switch.

5. A visual display unit as claimed in claim 4 wherein a common terminal of the color selection switch is connected to a voltage source for providing a voltage sufficient to operate any one of the AND-gates.

6. A visual display unit as claimed in claim 5 wherein the outputs of the AND-gates are connected to respective inputs of an OR-gate whose output is connected to said first switch.

7. A visual display unit as claimed in claim 6 wherein said first switch is provided by AND-gate having a first input connected to the output of the OR-gate and a second input connected to the light pen, the output of the AND-gate being connected to said computing means.

8. A visual display unit as claimed in claim 7 wherein the light pen is provided by a photosensitive cell connected to an amplifier, the amplifier being connected to the first input of the AND-gate.

* * * * *